United States Patent [19]

Norton

[11] Patent Number: 4,834,570
[45] Date of Patent: May 30, 1989

[54] SPRING-LOCKING MEMBER AND USE THEREOF IN THE CONSTRUCTION OF SECTIONAL ARTICLES SUCH AS FURNITURE AND THE LIKE

[75] Inventor: Ian F. Norton, Toronto, Canada
[73] Assignee: Union Carbide Canada Limited, Toronto, Canada
[21] Appl. No.: 927,979
[22] Filed: Nov. 7, 1986
[30] Foreign Application Priority Data
Oct. 30, 1986 [CA] Canada .................................. 521,822
[51] Int. Cl.⁴ ................................................ F16B 7/08
[52] U.S. Cl. .................................... 403/167; 403/329; 403/365
[58] Field of Search ...................... 403/329, 365, 409.1, 403/361, 24, 167, 25

[56] References Cited
U.S. PATENT DOCUMENTS 823,610  6/1906  Marbach .......................... 403/329 X
2,517,075  8/1950  Aquila ............................. 403/329 X
2,861,371  11/1958  Leshik ............................. 403/361 X

*Primary Examiner*—Andrew V. Kundrat
*Attorney, Agent, or Firm*—Sim & McBurney

[57] ABSTRACT

A spring-locking member is provided for use with a male member such as a two-by-four which is adapted for insertion into a female member such as an end frame member for outdoor furniture and the like. The spring-locking member is of resilient material and has a substantially constant cross-section in one direction. The cross-section includes a central portion and two side portions integral with the central portion. The side portions are upwardly offset with respect to the central portion, and each has a downwardly directed portion at its end remote from the central portion. The configuration is such that, in use, the spring-locking member is bent inwardly at the central portion to lie against the male member.

10 Claims, 2 Drawing Sheets

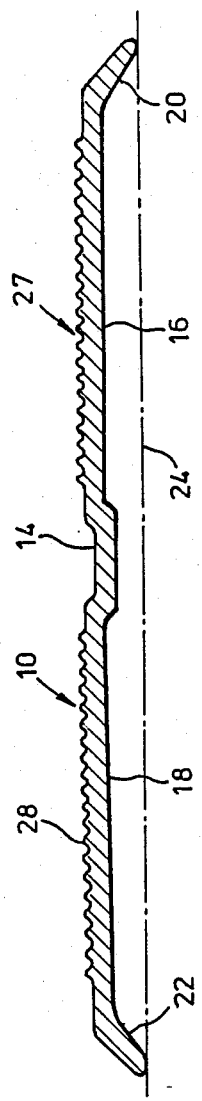
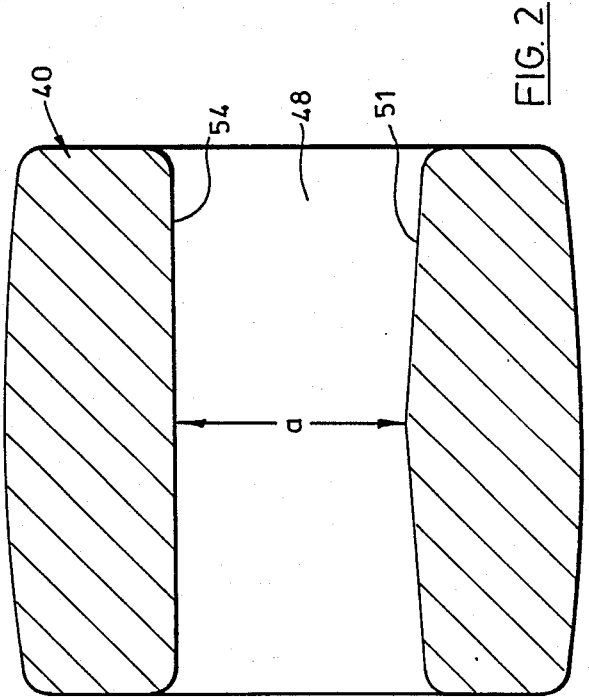

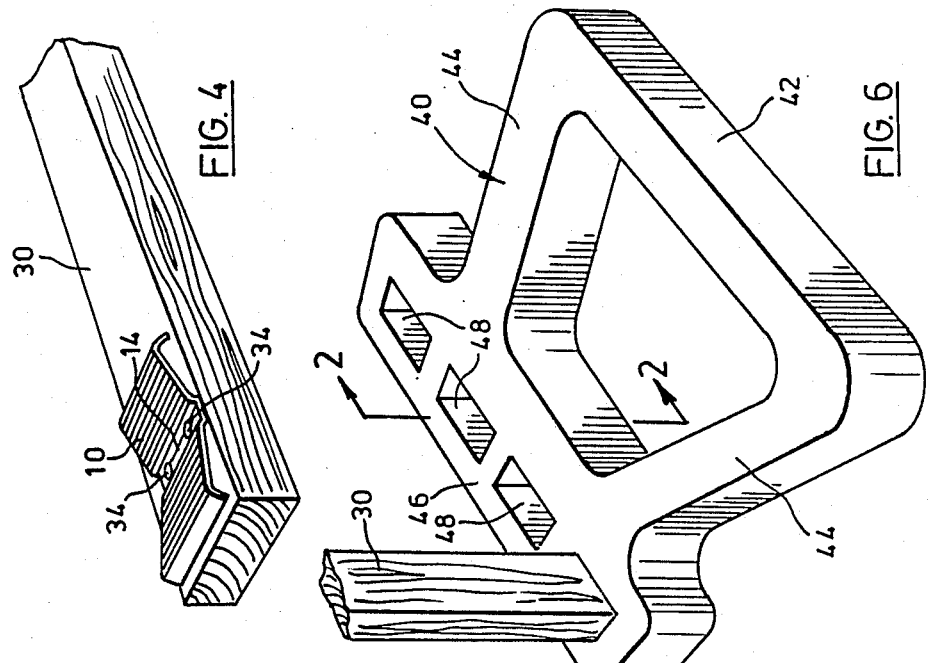
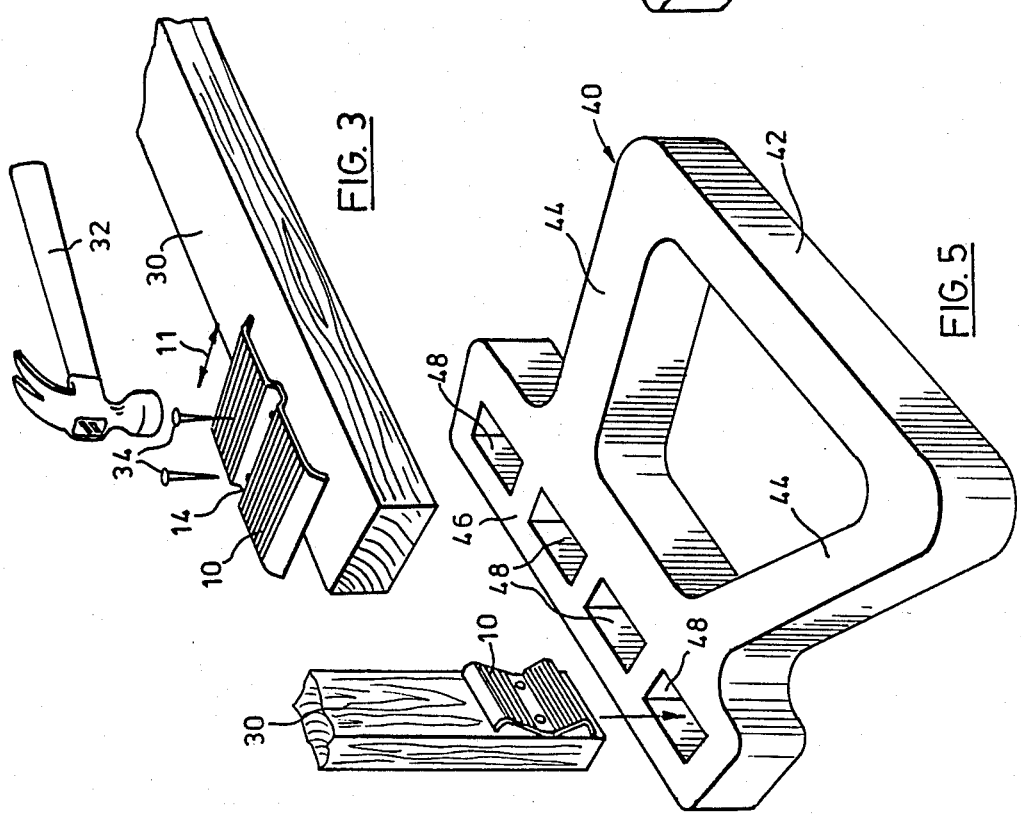

SPRING-LOCKING MEMBER AND USE THEREOF IN THE CONSTRUCTION OF SECTIONAL ARTICLES SUCH AS FURNITURE AND THE LIKE

This invention relates generally to the construction of sturdy and durable benches, chairs, tables and the like, suitable for outdoor use in parks, backyards and other indoor or outdoor locations.

BACKGROUND OF THIS INVENTION

It is known to utilize wooden two-by-fours or other planking material in the construction of picnic tables, park benches, and the like. It is also known to provide molded end frame members of concrete or similar durable material, having openings for receiving the wooden two-by-fours, the frame members defining seats, tables, benches, and so on.

However, there has been a constantly recurring problem relating to the securement of the ends of the two-by-fours or other planking materials in the frame members. In many prior designs, the openings are undersized, and the wood is forcefully driven into the undersized openings, to be held in place by the resulting compressive grip. However, this construction does not permit easy disassembly of the furniture item for transportation or storage. Furthermore, in the course of time the two-by-fours often crack, rot or otherwise deteriorate, and the compressive wedging grip on the ends of a two-by-four can make it very difficult to replace without replacing all of the other planking material a the same time.

Another problem arises due to the fact that milled wood varies slightly in thickness dimensions when purchased, and moreover wood is a material that expands and contracts substantially due to temperature and humidity fluctuations. For this reason, the joining of wood support members to molded frame members (whether of concrete, plastic or other material) requires special care and design considerations to ensure reliable assembly under different climatic situations.

Another primary consideration is that of simplicity of assembly. It is obviously desirable to design joints that do not require special tools or special skills on the part of the user.

GENERAL DESCRIPTION OF THIS INVENTION

In view of the disadvantages of the prior construction described above, it is an object of one aspect of this invention to provide a furniture construction utilizing elongated members adapted to fit into holes located in end frame members, and incorporating a special resilient shim or wedge which can be secured to an end of the elongated member (such as a two-by-four) prior to insertion into the opening in the end frame member. The resilient shim has the effect of closely controlling the force required to insert the elongated member into the opening, and is such as to ensure that the force necessary to withdraw the member will be the same as that required to insert it, thus facilitating disassembly for transportation or storage.

Accordingly, this invention provides a spring locking member for use with a male member that is adapted for insertion into a female member. The springlocking wedge is of semi-rigid material and has a substantially constant cross-section in one direction. The cross-section includes a central portion and two side portions integral with the central portion. Each side portion is upwardly offset with respect to the central portion and has a downwardly directed portion remote from the central portion.

Another aspect of the invention pertains to the spring locking member just described in combination with a frame member defining one or more openings into which one or more male support members can be inserted.

A final aspect of this invention pertains to the combination just described, in further combination with the male support members.

GENERAL DESCRIPTION OF THE DRAWINGS

One embodiment of this invention is illustrated in the accompanying drawings, in which like numerals denote like parts throughout the several views, and in which:

FIG. 1 is a cross-sectional view of a resilient spring locking member for use in this invention;

FIG. 2 is a cross-section taken through a frame member, at the line 2—2 in FIG. 6;

FIGS. 3 and 4 show sequential steps in the attachment of the spring locking member to a support member; and FIGS. 5 and 6 show sequential steps in the insertion of the support member into an opening in an end frame member.

DETAILED DESCRIPTION OF THE DRAWINGS

Attention is first directed to FIG. 1, which shows a spring locking member generally at 10. Member 10 is of resilient material such as polyethylene, polyvinyl chloride, polypropylene, A B S terpolymer, nylon, rubber, steel or other materials of similar physical characteristics, and has a substantially constant cross-section in one direction, the direction being indicated by the two-headed arrow 11 in FIG. 3. The cross-section which is constant is that shown in FIG. 1, and it will be noted that the cross-section includes a central portion 14 and two side portions 16 and 18 integral with the central portion 14. Each side portion 16 and 18 is upwardly offset with respect to the central portion 14, and each further has a downwardly direction portion 20 and 22, respectively, at the end remote from the central portion 14.

It will be further noted in FIG. 1 that the two downwardly directed portions 20 and 22 terminate at a plane shown by the broken line 24, the plane 24 being located below the position of the central portion 14 when the spring locking member 10 is unstressed (its condition in FIG. 1).

It will further be noted that each side portion 16 and 18 has a roughened area 27, 28 respectively, on its upper surface. In the preferred embodiment illustrated, the roughened area consists of ribs running in the direction of the arrow 11, thus maintaining a constant cross-section as shown in FIG. 1.

Attention is now directed to FIG. 3, which shows the end of a two-by-four 30, and the spring locking member 10 in position above the location where it is to be attached to the two-by-four 30. FIG. 3 illustrates a hammer 32 and two nails 34 aligned vertically in position above the central portion 14.

FIG. 4 shows the spring locking member 10 in position against the end of the two-by-four 30, and the nails 34 have been driven fully into the two-by-four 30, thus securing member 10 in place. It will also be noted in FIG. 4 that member 10 is stressed due to the fact that the central portion 14 is forced down against the two-by-four 30 by the nails 34, thus effectively bending the side portions 16 and 18 upwardly at an angle. This arises due to the fact that, when the shim member 10 is unstressed as seen in FIG. 1, the central portion 14 lies above the plane 24 in which the end portions 20 and 22 terminate.

In FIGS. 5 and 6, an end frame member 40 is illustrated, the end frame member having a lower pedestal portion 42, two upwardly and inwardly converging pillars 44, and an upper portion 46. The upper portion 46 has four aligned openings, and the two-by-four 30 is shown in position in alignment with the leftward or nearer of the openings 48 in FIG. 5. It will further be noted that the spring locking member 10 is located on what will be the underside of the two-by-four 30, when the item of furniture is constructed.

Attention is directed to FIG. 2, which indicates that the opening 48 tapers convergingly into the frame member 40 from both ends of the opening 48. More specifically, each opening 48 is substantially rectangular in the embodiment shown, and has a larger dimension which will be substantially horizontal in the assembled product, and a smaller dimension which will be substantially vertical in the assembled product. Both of these dimensions are perpendicular to the direction in which the opening 48 passes through the frame member 40. In FIG. 2, the smaller dimension is vertical, and it can be seem that the smaller dimension decreases smoothly to a minimum a substantially centrally of the frame member 40. This is due to the fact that the bottom wall 51 of the opening 48 slopes inwardly and upwardly from the outer ends of the opening 48, while the upper wall 54 is substantially flat.

FIG. 6 shows the completed insertion of the two-by-four 30 into the leftward or nearer opening 48 of the frame member 40. It will be appreciated that the double wedge shape taken up by the spring locking member 40 due to being fastened against the two-by-four 30 substantially corresponds with the double slope of the bottom wall 51 shown in FIG. 2, thus ensuring a secure fit and a tight grip, while allowing the support member or two-by-four 30 to be withdrawn from the frame member under substantially the same force requirement as was needed upon insertion.

Returning to FIGS. 1 and 4, it will be understood that the reason for the upward offset of the side portions 16 and 18 with respect to the central portion 14 relates to the need to "recess" the heads of the nails 34, so that these are not snagged or caught against the middle region of the lower wall 51 of the opening 48 seen in FIG. 2, upon insertion of the two-by-four 30. It will further be understood that the reason for the downward offset of the hypothetical plan 24 from the central portion 14 (see FIG. 1) relates to the desirability of strongly urging the side portions 16 and 18 against the surface of the two-by-four 30. This holds member 10 firmly in place, and ensures that the leading side portion 16 or 18 upon insertion or withdrawal will resiliently compress as required against the two-by-four 30.

The outward slope of the downwardly directed portions 20 and 22 further facilitates the compression of the side portions 16 and 18 against the two-by-four 30 upon insertion or withdrawal, since the angled contact permits the contact point to slide or slip outwardly away from the central portion 14 upon compression.

It will be appreciated that the spring locking member set forth herein can be utilized with any form of support member to which the member can be satisfactorily attached. It will further be appreciated that the end frame member 40 shown in FIGS. 5 and 6 is merely one example of a possible configuration. Benches, tables and the like would have different configurations for the end frame members, and could include some openings 48 that are not horizontally oriented as in FIGS. 5 and 6.

Regarding the spring locking member, it will be understood that, although a non-corrosive plastic material provides highly desirable characteristics, the member can also be manufactured of non-corrosive metal or another material having a semi-rigid, resilient characteristic. Moreover, although the member has been illustrated as being fastened with small nails, other securement means such as double-sided adhesive tape could also be employed.

Additionally, while a taper angle of approximately 5° at the bottom of the female opening in the end frame member has been found to be quite satisfactory, some departure from this angle could be utilized.

Finally, it will be realized that another advantage arising from the placing of the spring locking member under the two-by-four rather than above it relates to its function as a spring. The member is in a position to absorb stress forces arising during use that otherwise could cause fracturing of the support member or the end frame member.

While one embodiment of this invention has been illustrated in the accompanying drawings and described hereinabove, it will be evident to those skilled in the art that changes and modifications may be made therein, without departing from the essence of this invention as set forth in the appended claims.

I claim:

1. For use with a male member, the combination of a spring-locking member and a frame member defining an opening into which the male member can be inserted, the spring-locking member being of resilient material and having a substantially-constant cross-section in one direction, the cross-section including a central portion and two side portions integral with the central portion, each side portion being upwardly offset with respect to the central portion, and having a downwardly and outwardly directed portion remote from the central portion, the opening passing entirely through the frame member, the opening being substantially rectangular and having a larger dimension and a smaller dimension both perpendicular to the direction in which it passes through the frame member, the smaller dimension decreasing smoothly to a minimum substantially centrally of the frame member.

2. The combination claimed in claim 1 in which the opening has a lower surface and an upper surface spaced apart to define said smaller dimension, the upper surface being substantially flat, the lower surface sloping upwardly and inwardly from both ends of the opening.

3. The combination claimed in claim 1, in which the two downwardly directed portions terminate at a plane located below the position of the central portion when the spring-locking member is unstressed, whereby fasteners can be driven through the central portion to secure the same to the male member and to stress the spring-locking member to cause it to lie closely adjacent the male member.

4. The combination claimed in claim 3, in which each side portion has a roughened area on its upper surface.

5. The combination claimed in claim 4, in which each roughened area comprises integral ribs.

6. The combination claimed in claim 1, in which the spring-locking member is made of a material selected from the group consisting of: polyethylene, polyvinyl chloride, polypropylene and A B S terpolymer.

7. For use with a plurality of support members each having a substantially rectangular cross-section, the combination of two end frame members and a plurality of spring-locking members, each spring-locking member being of substantially constant cross-section and including a central portion and two side portions, each side portion being upwardly offset adjacent the central portion and each terminating in a downwardly and outwardly directed portion such that the latter portions terminate in a plane which lies below the level of the central portion when the spring-locking member is unstressed, whereby fasteners can be driven through the central portion to adhere said member to one of the support members and to cause it to lie closely adjacent the support member, each end frame member defining a plurality of openings therethrough into which ends of the support members can be inserted, the openings being sized to allow forceful insertion of an end of a support member to which a spring-locking member has been affixed.

8. The combination claimed in claim 7, in which each opening tapers convergingly inward when seen in a plane perpendicular to the support member surface to which the shim member has been affixed.

9. The combination claimed in claim 7, in which each opening has a double inwardly converging taper when seen in a plane perpendicular to the support member surface to which the shim member has been affixed.

10. The combination claimed in claim 7, in which each opening is rectangular and is defined by an upper surface, a lower surface and two side surfaces, the upper and lower surfaces being wider than the side surfaces, the upper surface being substantially flat, the lower surface sloping upwardly and inwardly from both ends of the respective opening.

* * * * *